July 8, 1958 F. F. KISHLINE ET AL 2,842,063
WATER PUMP MOUNTING
Filed June 24, 1955
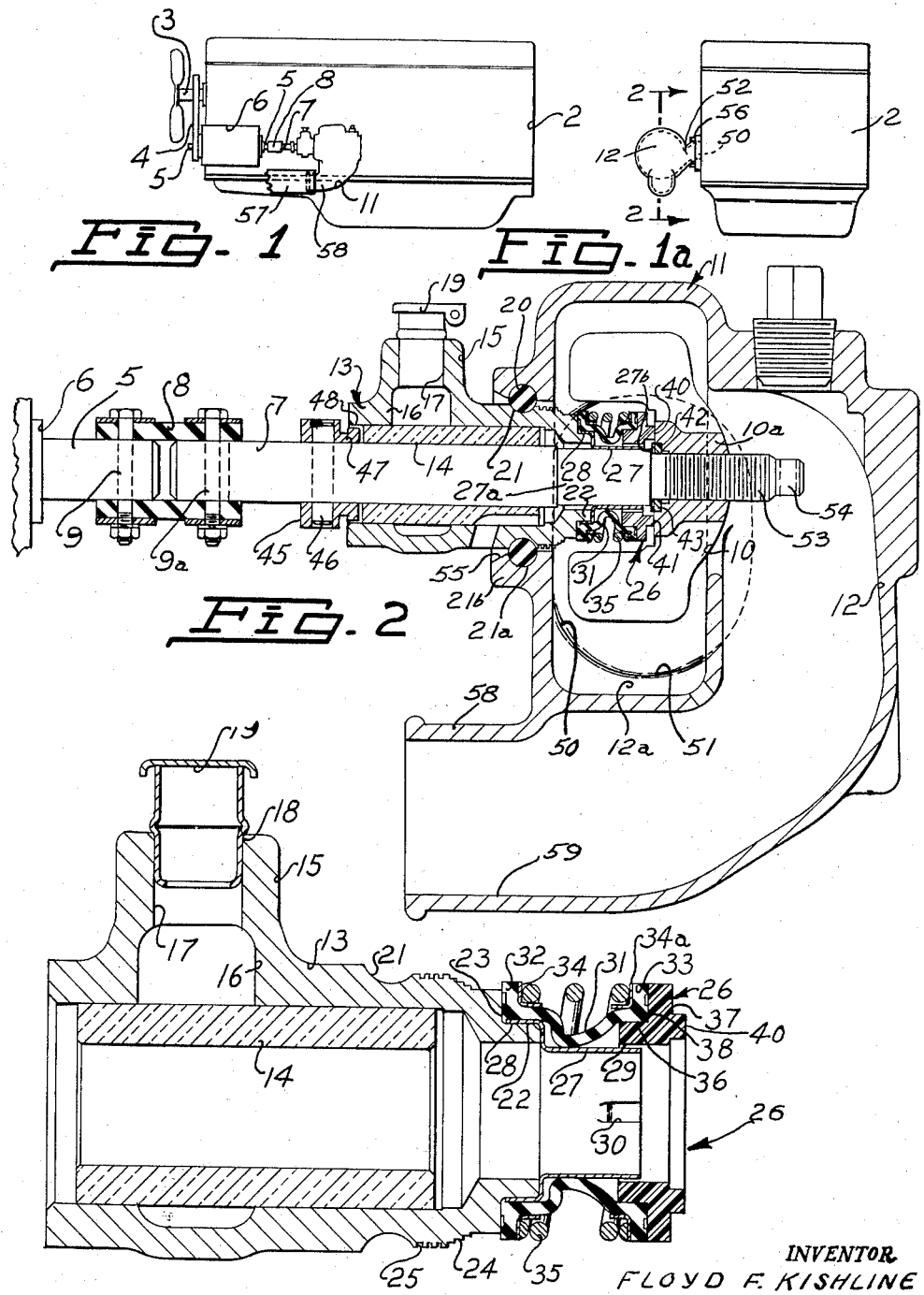
INVENTOR.
FLOYD F. KISHLINE
JOHNSTON S. VOIGT
GUSTAV V. HEDSTROM
BY Carl J. Barbee
ATTORNEY

United States Patent Office 2,842,063
Patented July 8, 1958

2,842,063

WATER PUMP MOUNTING

Floyd F. Kishline, Johnston S. Voigt, and Gustav V. Hedstrom, Kenosha, Wis., assignors to American Motors Corporation, Kenosha, Wis., a corporation of Maryland Application June 24, 1955, Serial No. 517,846

3 Claims. (Cl. 103—103)

The invention relates to a water pump assembly for use in the water circulating system of an automobile vehicle.

The invention particularly contemplates the provision of a shaft seal assembly for use in combination with a resiliently mounted two-piece pump housing structure as disclosed to Patent No. 2,496,219 issued on January 31, 1950. In the type of pump structure as shown in this patent, by making the pump housing of a two-piece structure and by interposing an elastic O-ring between said pieces, that part of the pump housing which is directly connected to the engine block is sufficiently insulated from the second piece so that only a small amount of engine vibration is transmitted to the second piece. The second piece is in the form of a bearing housing which supports the pump shaft, bearing and appropriate shaft seal.

The construction details of this two-piece pump housing structure (wherein the bearing housing projects into the interior of the pump housing) has heretofore posed a problem with reference to the arrangement of a suitable shaft seal which will function satisfactorily in combination with the resilient mounting of the bearing housing relative to the pump housing.

The principal object of the invention is to provide a two-piece resiliently mounted pump housing structure for supporting a rotating shaft in combination with a suitable shaft seal.

A further object is to provide a water pump assembly having an internally threaded impeller which may be readily assembled onto the inner end of the pump shaft and which may be readily disassembled for servicing the pump assembly.

A further object of the invention is to provide a pump assembly which is relatively simple to manufacture.

A further object is to provide a shaft seal having structural details making it suitable for use in connection with a two-piece pump housing structure.

Other objects and advantages of the invention will be apparent from the ensuing specification and appended drawing in which:

Figure 1 is a side elevational view of the water pump assembly mounted on one side of a conventional automotive engine;

Figure 1a is an end view thereof;

Figure 2 is a sectional view taken on the line 2—2 of Figure 1a; and

Figure 3 is an enlarged sectional view of the shaft seal and the bearing housing portion of the two-piece pump housing.

In general the automobile engine 2 drives the conventional fan shaft 3 which in turn through V-belt 4 drives the generator shaft 5 of generator 6. The generator shaft is coupled to the water pump shaft 7 through the medium of a flexible sleeve 8, the opposite ends of which are telescopically positioned over the adjoining ends of the generator shaft and pump shaft respectively and suitable bolts 9 and 9a may be utilized for securing the opposite ends of the sleeve to the respective shafts. The bolts may have removable nuts threaded thereonto for permitting the shafts to be quickly disconnected from the coupling sleeve when removing the pump assembly for servicing purposes.

The pump impeller 10 has its central hub portion 10a internally threaded so that the externally threaded inner end of the pump shaft can be readily threaded to the impeller when assembling the pump assembly.

The two-piece pump housing structure which is identified generally by the numeral 11 includes the pump housing 12 which resiliently supports the pump shaft bearing retainer housing 13. A sleeve type bearing 14 is mounted internal of the longitudinal bore in the bearing housing 13 providing the required stationary bearing support for the rotating pump shaft 7. The bearing sleeve may be of a generally porous composition so that an appropriate lubricant may impregnate same. The bearing housing may have a radially outwardly extending boss 15 with an axial bore 17 communicating with the lubricant storage chamber 16. A lubricant reception cup 18 may be pressed into the boss bore and have its outer end closed off with a suitable cap 19 which may be opened as desired for introducing lubricant into the cup 18.

The bearing housing 13 is supported relative to the pump housing 12 through the medium of a rubber-like O-ring 20 which is interposed between the bearing housing and the pump housing in appropriate annular grooves 21 and 21a formed respectively in the cylindrical external wall of the bearing housing and the cylindrical internal wall of the bore in boss 21b. The external wall of the bearing housing is provided with a series of annular steps 24 and a series of annular grooves 25 to facilitate the appropriate rolling of the O-ring into the ultimate annular grooves 21 and 21a during the assembling of the bearing housing relative to the pump housing.

A shaft seal assembly designated generally by the numeral 26 includes a metal piloting sleeve 27 which is telescopically positioned on the cylindrical external surface of the reduced portion 27a on the pump shaft and said sleeve is provided with a diametrically enlarged annular collar portion 28 which is press fitted onto the cylindrical external surface of the diametrically reduced extension 22 at the inner end of the bearing housing. The sleeve is provided with circumferentially spaced upset portions 30 which serve as piloting surfaces for the cylindrical internal wall 29 of the annular sealing washer indicated generally by the numeral 37. These upset portions 30 also serve to hold the sealing sleeve 31 in position on the outside surface of the pilot sleeve 27. This sealing sleeve may be formed of rubber or some similar material and is provided at its opposite ends with radially outwardly extending annular sealing flanges 32 and 33, the end faces of which bear respectively against the annular shoulder 23 on the bearing housing and the annular shoulder 38 on the sealing washer 37. A compression spring 35 exerts continuous axial thrust against the annular washers 34 and 34a thereby forcing the annular flanges of the sealing sleeve into sealing engagement against the housing shoulder 23 and washer face 38 to form effective seals at these locations whereby to prevent water from escaping from the pump chamber onto the pump shaft.

The sealing washer has an axially extending annular portion, the end face 40 of which bears in sealing engagement against the annular end face 41 of the hub portion 10a of the impeller, thereby preventing water from escaping from the pump chamber onto the pump shaft at this location. It is understood, of course, that the washer 37 is stationary while the pump impeller is rotating, the seal being effected between a rotative and a non-rotative surface. The spring 35, of course, maintains the necessary axial pressure against washer 37 for maintaining the desired sealing effect. The impeller hub is provided with a counterbore 42 which accommodates a nylon washer 43 which is tightly engaged between the annular end face of the impeller hub and the annular shoulder 27b on the pump shaft. The washer prevents any water escaping from the pump chamber along the threads of the pump shaft beyond that location on the pump shaft where the nylon washer is situated. A collar 45 is secured to the pump shaft by means of pin 46 and the inner end 47 of the collar projects into the open end 48 of the bearing housing for limiting any axial movement of the bearing 14 on the pump shaft.

In the assembling of the over-all pump assembly, the pump shaft and various associated parts may be assembled relative to the bearing housing to form a complete subassembly which is then assembled relative to the pump housing 12. In effecting the sub-assembly, the bearing 14 may be inserted into the bearing housing, after which the pump shaft is guided through the bearing, the collar 45 being previously fixed thereto. Then the shaft seal assembly is guided over the threaded end of the pump shaft and the annular flange 28 is pressed onto the end of the bearing housing as explained hereinbefore. The O-ring 20 is manipulated on the end of the bearing housing up to the serrations 24. The impeller 10 is then inserted into the pump chamber 12a by initially introducing same through the mouth 50 of the water outlet passage 51 formed in the outwardly directed boss 52 of the pump housing. The threaded end portion 53 of the pump shaft is of considerable length and terminates with a diametrically reduced nose portion 54 which may be readily guided into the counter-bore 42 in the impeller hub preparatory to threading the pump shaft into the impeller. The impeller can be held stationary by having access thereto through the passage 51 while the threaded end of the pump shaft is introduced through the mouth 55 of the pump housing. As previously mentioned, the threaded end of the pump shaft is of sufficient length in order that the pump shaft may be threaded a considerable distance into the impeller hub before the O-ring comes into engagement with the mouth 55 of the pump housing. Then pressure may be applied axially of the pump shaft to cause the O-ring to roll up over the serrations on the bearing housing and eventually drop into the annular grooves in the bearing housing and pump housing as previously explained. The pump shaft is threaded into the impeller hub until the sealing washer 43 is tightly wedged between the annular faces on the impeller hub and pump shaft as previously explained. Then the pump structure can be bolted to the engine block by means of bolts 56. If desired, the coupling sleeve 8 can be connected to both the generator shaft and the pump shaft prior to bolting the pump housing to the engine block. The pump assembly may be readily serviced at a later date by simply generally reversing the afore-mentioned assembly steps.

In the general operation of the water circulating system, the water is initially introduced into the automobile radiator (not shown), the radiator having an outlet near the lower end thereof to which the flexible hose 57 (see Figure 1) is connected, the hose being connected at its opposite end to the extension 58 on the pump housing. The water thus travels from the radiator through the hose 57 into the entrance passage 59 of the pump housing from whence the rotation of the impeller expels the water through passage 51 into the engine block. The water is then returned from the engine block to the radiator, thus completing the conventional water circulating cycle of an automotive vehicle. The water which is permanently present within the pump housing is thus prevented from escaping therefrom by means of the O-ring 21 and by means of the various other sealing devices at the remaining locations where sealing is needed—these locations and the sealing devices being previously explained herein.

We claim:

1. A water pump for an engine comprising: an impeller housing having an impeller chamber and a water passage in communication with but offset from said chamber, said housing having a mouth opening into the impeller chamber on the side of said chamber opposite from the side occupied by the offset water passage; a bearing housing; a pump shaft extending through the bearing housing; a bearing within said bearing housing for supporting the pump shaft, said bearing housing projecting into the mouth of the impeller housing; a resilient sealing ring encircling the exterior of the bearing housing and being interposed between the bearing housing and the impeller housing in the mouth thereof; an impeller threaded onto the end of the pump shaft and the threaded portion of the pump shaft being of substantial length so as to project from the impeller chamber into the offset water passage.

2. A water pump as set forth in claim 1 wherein the distance from the sealing ring to that end of the bearing housing which projects into the impeller housing mouth is less than the length of the threaded portion of the pump shaft.

3. A water pump as set forth in claim 1 wherein the impeller has a central hub portion having a flat side wall and a sealing device is telescopically positioned on the pump shaft between the end of the bearing housing and the flat side wall of the impeller hub for preventing water from gaining access to the pump shaft.

References Cited in the file of this patent

UNITED STATES PATENTS

| 1,159,868 | Rogers | Nov. 9, 1915 |
| 1,661,325 | Derrick | Mar. 6, 1928 |
| 2,006,727 | Ardrey | July 2, 1935 |
| 2,111,441 | Thrush | Mar. 5, 1938 |
| 2,200,151 | Burkhart | May 7, 1940 |
| 2,402,995 | Garraway | July 2, 1946 |
| 2,408,909 | Brummer | Oct. 8, 1946 |
| 2,453,391 | Whittingham | Nov. 8, 1948 |
| 2,668,068 | Bredemeier | Feb. 2, 1954 |
| 2,671,407 | Higbie | Mar. 9, 1954 |

UNITED STATES PATENT OFFICE

CERTIFICATE OF CORRECTION

Patent No. 2,842,063                                        July 8, 1958

Floyd F. Kishline et al.

It is hereby certified that error appears in the printed specification of the above numbered patent requiring correction and that the said Letters Patent should read as corrected below.

Column 1, line 16, for "automobile" read -- automotive --; line 21, for "disclosed to" read -- disclosed in --.

Signed and sealed this 7th day of October 1958.

(SEAL)
Attest:

KARL H. AXLINE
Attesting Officer

ROBERT C. WATSON
Commissioner of Patents